United States Patent
Watson Fyfe

(10) Patent No.: US 6,598,641 B1
(45) Date of Patent: Jul. 29, 2003

(54) STITCHING PLY EDGES INTO BEAD REGION

(75) Inventor: Eric Thomas Watson Fyfe, Solihull (GB)

(73) Assignee: Sumitomo Rubber Industries, Limited, Kobe (JP)

( * ) Notice: Subject to any disclaimer, the term of this patent is extended or adjusted under 35 U.S.C. 154(b) by 0 days.

(21) Appl. No.: 09/477,797

(22) Filed: Jan. 5, 2000

(30) Foreign Application Priority Data

Jan. 9, 1999 (GB) .............................. 9900378

(51) Int. Cl.[7] .......................... B29D 30/48; B60C 15/00
(52) U.S. Cl. ................ 152/539; 152/540; 152/550; 152/558; 156/117; 156/130.7; 156/135
(58) Field of Search .................. 156/117, 135, 156/130.7; 152/539, 540, 548, 550, 552, 558

(56) References Cited

U.S. PATENT DOCUMENTS

| | | | | |
|---|---|---|---|---|
| 1,558,904 A | * | 10/1925 | Midgley | 156/130.7 |
| 2,966,933 A | | 1/1961 | Boussu et al. | |
| 3,458,146 A | * | 7/1969 | Warner | 156/117 |
| 3,946,785 A | | 3/1976 | Powers et al. | |
| 4,277,295 A | * | 7/1981 | Schmidt | 152/539 |
| 5,858,138 A | * | 1/1999 | Jara | 152/548 |
| 5,885,387 A | * | 3/1999 | Ueyoko | 152/540 |
| 6,085,817 A | * | 7/2000 | Ogawa | 152/539 |
| 6,109,322 A | * | 8/2000 | Benzing et al. | 152/548 |

FOREIGN PATENT DOCUMENTS

| | | | | |
|---|---|---|---|---|
| DE | 3631736 | * | 3/1988 | 152/539 |
| EP | 0 934 837 A2 | | 8/1999 | |
| GB | 393312 | | 6/1933 | |
| JP | 9-226315 | * | 9/1997 | |
| JP | 9-234806 | * | 9/1997 | |
| JP | 10-71654 | * | 3/1998 | |

OTHER PUBLICATIONS

Blow, *Rubber Technology and Manufacture*, pp. 349–371, 1971.*

* cited by examiner

*Primary Examiner*—Steven D. Maki
(74) *Attorney, Agent, or Firm*—Birch, Stewart, Kolasch & Birch, LLP

(57) ABSTRACT

A method of assembling a tire carcass comprising applying a cord reinforced rubber ply to a toroidal-shaped former such that the edges of the ply are located on radially inner portions of the former, placing a circular bead component adjacent to each edge and stitching each ply edge to its said circular bead component to secure the ply edge in the region of the tire bead.

10 Claims, 1 Drawing Sheet

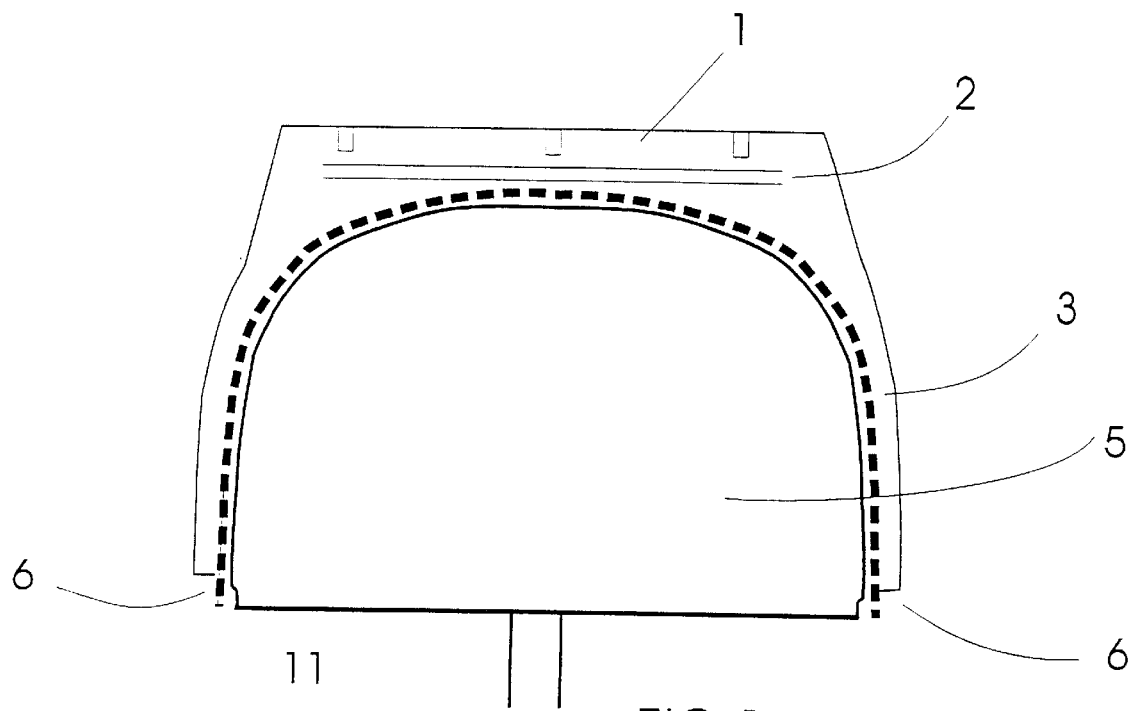
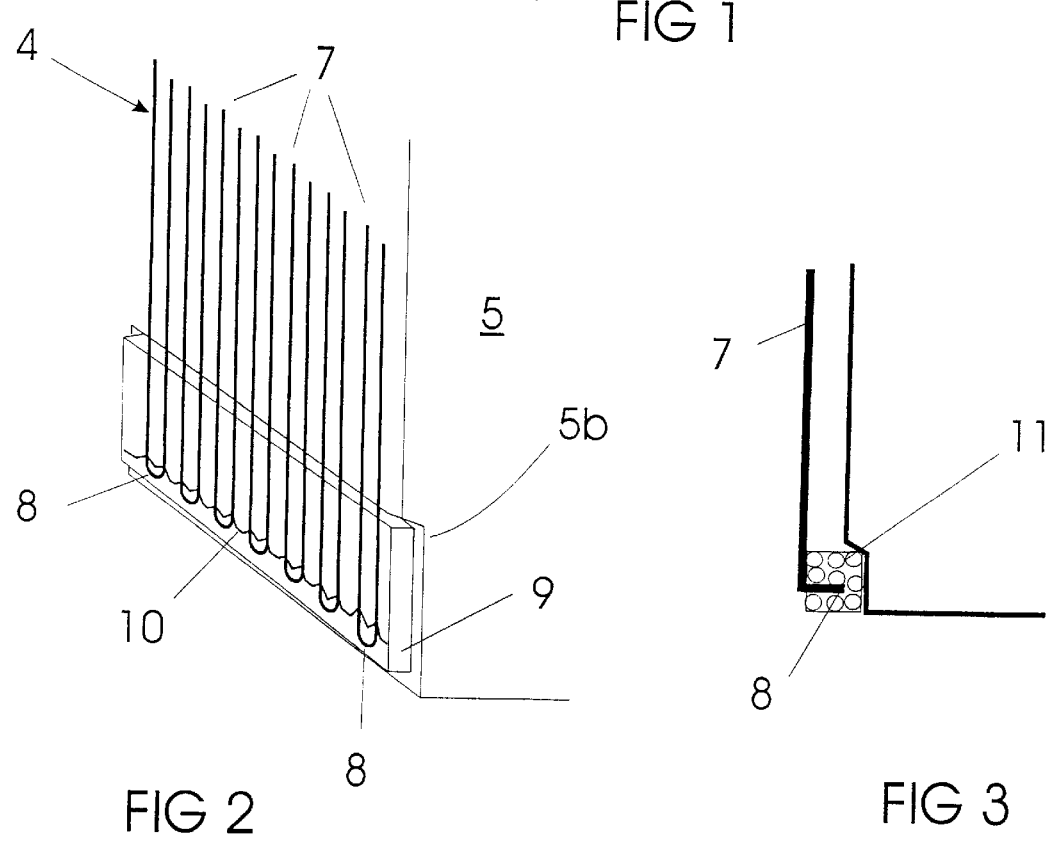

STITCHING PLY EDGES INTO BEAD REGION

The present invention relates to a method of assembling a tire carcass and the tire resulting therefrom.

The conventional pneumatic tire comprises a toroidally-shaped tire carcass which extends between two wheelrim-engaging bead regions through sidewall regions and a ground contacting tread region. The carcass is reinforced by one or more plies of rubber fabric having axially extending reinforcements which pass through the tread and sidewall regions and are anchored in their edge portions to an annular inextensible bead core in the radially inner part of the bead region One of the problems facing the tiremaker is ensuring that the ply edge remains in the correct position in the bead region during assembly of the remainder of the tire components whilst accommodating intermediate and/or final shaping of the resultant uncured tire blank prior to vulcanization.

One solution to the above problem which has been widely adopted is to turn the ply edge portion fully around the annular bead core before shaping the ply into a toroid.

Such a construction however is both wasteful of carcass ply material forming the turnup and has the further disadvantage that the ply ending is taken into the region of greater flexure which tends to increase the risk of ply edge looseness problems during later service life of the tire.

Another proposal applicable particularly where the carcass reinforcement comprises one or more cords wound continuously in a zigzag configuration from bead to bead is to hold each ply end loop as it is formed on a small hook or pin so that the whole periphery of the ply edge is temporarily secured in position during assembly of the uncured tire. However the additional equipment necessary to implement this on the tire building machine is complex and expensive and tire production is slow.

It is an object of the present invention to provide a method of assembling a reinforcing ply in a tire carcass and a tire carcass construction which avoids the above-mentioned problems.

According to one aspect of the present invention a method of assembling a tire carcass comprises applying a cord reinforced rubber ply to a toroidal-shaped former such that the edges of the ply are located on radially inner portions of the former, placing a circular bead component adjacent to each edge and stitching each ply edge to its said circular bead component to secure the ply edge in the region of the tire bead without forming a turn-up. A cured tire is formed by subsequently assembling tire components and the tire carcass to form a tire and curing the tire.

The stitching step may comprise sewing the cord ends of the ply to the circular bead component. Alternatively the stitching may comprise pushing needles through the cord ends and in to the circular bead component so as to press and engage the cord ends in the circular bead component.

The circular bead component may be a conventional bead or an additional component and in that case the stitching step comprises stitching the cord ends in to the bead hoop or separately the component member.

A second aspect of the invention provides a tire carcass comprising two spaced-apart bead regions, two sidewalls, a central tread region and a toroidal reinforcement ply comprising a rubber sheet reinforced by reinforcement cords wherein the component ply has in each bead region a ply edge which is located in its bead region by being stitched to a circular bead component adjacent to said edge.

The circular bead component may be an additional bead component or an inextensible bead hoop which may comprise a winding of steel wire, aramid or a ring of plastics material.

Where the circular bead component is a separate component it may comprise a precured rubber ring or preferably a ribbon or tape of fabric to hold the reinforcement ply edges during subsequent tire assembly. The fabric rubber or tape may be conventional tire fabric or may be of elastic cords to allow a degree of stretch.

The stitching of the reinforcement cords to the circular bead component may be by means of a thread or filament which passes in to the circular bead component at spaced-apart intervals between which it passes over successive cord ends. Alternatively the cord ends themselves may be engaged in the circular bead reinforcement by needling. The invention is particularly advantageous with a tire comprising a single cord reinforcement for the carcass ply wherein the cord is looped in each bead region so that it goes back parallel to itself from bead to bead.

Further aspects of the present invention will be apparent from the following description by way of example only of embodiments in conjunction with the attached diagrammatic drawings in which:

FIG. 1 is a cross-sectional view of a tire on a solid former;

FIG. 2 is an enlarged detail view of one embodiment of a bead region of the tire shown in FIG. 1; and FIG. 3 shows an alternative bead construction to FIG. 2.

The tire shown in FIG. 1 is a radial tire having a tread region 1 reinforced by a breaker assembly 2, rubber sidewalls 3 and a carcass reinforcement 4 which extends around the cross-section of the tire to form the traditional toroidal tire shape.

The tire is shown diagrammatically on a solid former 5 which is used to build the tire. It should be understood that in the normal tire building process the tread and breaker would not be present but it is shown here for completeness to illustrate the overall tire.

The present invention relates to the fitting of bead regions to the tire during its assembly and two embodiments are shown. The first is in FIG. 2 which shows a reinforcement carcass 4 comprising a single cord which in each bead region 6 is folded back on itself to form a loop 8 at the edge of the reinforcement ply 4. The reinforcement cord then travels around the tire in a radial direction to the other bead where a looped is formed and it returns again to the first bead. The resultant ply edge region comprises a series of spaced-apart loops 8. Such a tire construction is already known and the known method of assembly is to locate the loops on pins on the solid former 5.

The embodiment of FIG. 2 of the present invention provides at each side of the former in the bead region 6 a ring of fabric which preferably is a cross-woven fabric embedded in rubber formed as a ring. One ring is positioned in each bead region located against a step 5b in the solid former 5.

The method of assembly comprises winding the single cord reinforcement from edge to edge around the solid former and at the same time stitching the loops 8 by means of a sewing head each loop to the fabric ring 9. The resultant thread holding the looped edges 8 to the ring 9 is shown as 10 in FIG. 2. The stitching thread may be a single filament, a bunch of filaments, a thread or a cord and may be of any of the normal materials in the tire art, including in particular rayon and polyester. Various stitches can be used and the thread may pass through the strip 9 or only into it.

The resultant tire bead assembly comprises an array of looped ends 8 which are located in spaced-apart relationship by the strip 9 in a manner which allows subsequent handling for further tire assembly. The next tire assembly stages may comprise fitting a bead hoop on one or both sides of the edge region, either a pre-assembled bead hoop or by winding to build the bead hoop in position either on the solid former or on an alternative former or mandrel. The circular bead component 9 shown as a fabric strip may be replaced by a pre-cured rubber ring or indeed a ring of plastics material of any desired cross-section.

In the embodiment of FIG. 3 the reinforcement cords 7 have their ends 8 engaged in a square section bead 11 which comprises nine turns of a single steel wire. The ends 8 are put into the bead assembly 11 by means of needles which are driven in an axial direction into the bead region and which have blunt ends so as to pick up each cord loop and push it into the bead region for retention therein.

In the embodiment of FIG. 3 it is preferred that the cords have looped ends 8 although the invention can be applied for cut end cords. In the latter case the ends of each cord are held by a roller or foot a small distance radially outwards from the end until the needling operation engages the end of the cord in the bead.

The present invention thus provides a means of positively locating the ends or edges of the reinforcement cords of a tire built on a solid former for subsequent tire building. The process allows the use of a sewing or stitching machine which can follow the cord laying head and fasten each end in turn in relation to the previous cord end so that a uniform assembly is created and maintained.

I claim:

1. A method of forming a cured tire comprising tire components and a tire carcass, the method comprising assembling a tire carcass by (i) applying a cord reinforced rubber ply to a toroidal-shaped former such that the edges of the ply are located on radially inner portions of the former, (ii) placing a circular bead component comprising an inextensible bead hoop adjacent to each edge and (iii) stitching each ply edge of the cord reinforced rubber ply to its circular bead component by sewing or needling cord ends of the cord reinforced rubber ply to said inextensible bead hoop without forming a turn-up; and subsequently assembling tire components and the tire carcass to form a tire, and curing the tire.

2. A method according to claim 1, wherein the stitching step comprises sewing the cord ends of the ply to the circular bead component.

3. A method according to claim 1, wherein the stitching step comprises punching needles through the cord ends and into the circular bead component so as to press and engage the cord ends in the circular bead component.

4. A cured tire formed according to claim 1.

5. A tire carcass comprising two spaced-apart bead regions, two sidewalls, a central tread region and a toroidal reinforcement ply comprising a rubber sheet reinforced by reinforcement cords wherein the reinforcement ply has in each bead region a ply edge which is located in its bead region by being attached by sewing or needling to a circular bead component adjacent to said edge without forming a turn-up, wherein the circular bead component is an inextensible bead hoop.

6. A tire carcass according to claim 5, wherein the inextensible bead hoop comprises a winding of steel wire or aramid cord.

7. A tire carcass according to claim 5, wherein the inextensible bead hoop comprises a ring of plastics material.

8. A tire carcass according to claim 5, wherein the cord ends of the reinforcement ply are attached to the inextensible bead hoop by sewing with a thread or filament which passes into the circular bead component at spaced-apart intervals between which the thread or filament passes over successive cord ends.

9. A tire carcass according to claim 5, wherein the cord ends of the reinforcement ply are each engaged in a respective circular bead reinforcement by needling.

10. A tire according to claim 5, wherein the reinforcement cords comprise a single cord which is looped in the bead region and which passes from bead to bead around the tire.

* * * * *